United States Patent [19]
Aduddell

[11] Patent Number: 5,436,612
[45] Date of Patent: Jul. 25, 1995

[54] AUDIBLE VEHICLE MONITORING APPARATUS

[76] Inventor: Richard N. Aduddell, 4516 Victory Pl. SW., Port Orchard, Wash. 98366

[21] Appl. No.: 220,203

[22] Filed: Mar. 30, 1994

[51] Int. Cl.⁶ ............................................. B60Q 1/00
[52] U.S. Cl. .................................. 340/438; 340/443; 340/446
[58] Field of Search ............... 340/438, 442, 443, 445, 340/447, 446; 116/34 R; 381/169, 188, 205

[56] References Cited

U.S. PATENT DOCUMENTS

| | | |
|---|---|---|
| 3,489,998 | 6/1965 | O'Neal ................................ 340/446 |
| 3,738,308 | 6/1973 | Barabino ........................... 116/34 R |
| 3,939,418 | 2/1976 | Morrison et al. . |
| 4,087,783 | 5/1978 | Steffen . |
| 4,574,490 | 3/1986 | Curchod . |
| 4,876,710 | 10/1989 | Reed et al. . |
| 4,943,798 | 7/1990 | Wayne ................................ 340/446 |
| 4,970,491 | 11/1990 | Saint et al. ......................... 340/447 |
| 5,008,647 | 4/1991 | Brunt et al. . |

Primary Examiner—Jeffery A. Hofsass

[57] ABSTRACT

A new and improved audible vehicle monitoring apparatus includes a sound monitoring assembly adapted for connecting to an undercarriage portion of a wheeled vehicle. A monitor housing assembly connects to the undercarriage portion of the wheeled vehicle. A microphone assembly and a first power source are retained by the monitor housing assembly. A wave transmitter assembly is powered by the first power source and is retained by the monitor housing assembly. The wave transmitter assembly is connected to the microphone assembly and transmits waves representing sounds picked up by the microphone assembly. An audible signalling assembly is retained in a cab portion of a motor vehicle in proximity of a driver within easy hearing and easy reach of the driver. The audible signalling assembly includes a signaling housing assembly, and a second power source is housed within the signaling housing assembly. A wave receiver assembly is retained by the signaling housing assembly and is powered by the second power source. The wave receiver assembly receives the transmitted waves from the sound monitoring assembly. The audible signalling assembly includes a speaker assembly which receives audio signals from the wave receiver assembly and provides audible signals to the driver of the motor vehicle. A plurality of sound monitoring assemblies can be connected to selected locations of the undercarriage portion of the wheeled vehicle, and the audible signalling assembly includes a selector switch assembly for selecting which respective sound monitoring assembly is to be listened to by a motor vehicle driver.

1 Claim, 4 Drawing Sheets

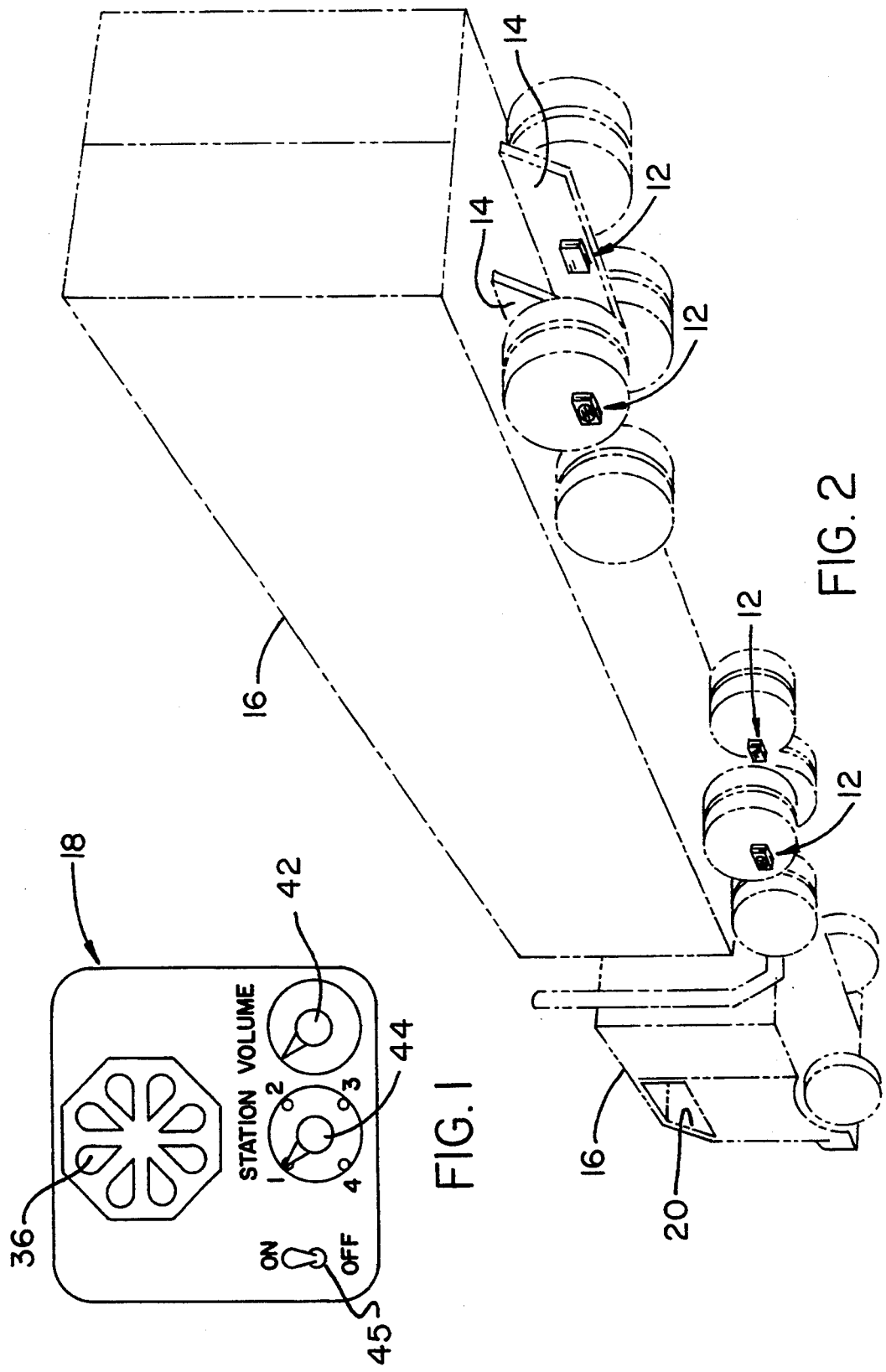

AUDIBLE VEHICLE MONITORING APPARATUS

BACKGROUND OF THE INVENTION

1. Field of the Invention

The present invention relates generally to devices for monitoring vehicle conditions and, more particularly, to devices especially adapted for vehicle conditions when the vehicle is in motion.

2. Description of the Prior Art

When vehicles are in motion a number of hazardous conditions can develop as a result of the motion. For example, the rubber material that is used for recapping a tire can become loose, can tear, and can fly off of the tire during vehicle motion. Bad wheel bearings can undergo failure during vehicle motion. Loose universal joints can undergo failure during vehicle motion. Unfortunately, the serious, potentially hazardous conditions described above often do not reveal themselves until after a serious and often dangerous consequence has been manifested. More specifically, one may not become aware of a recapped tire problem until the recapped rubber flies off of the tire. One may not become award of defective wheel bearings until the wheel bearings undergo failure. One may not become aware of a defective universal joint until the universal joint fails.

In view of the above, it would be desirable if a device were provided that could detect looseness of the recapping material on a recapped tire before the recapping material flies off of the tire. Also, it would be desirable if a device could be provided which detects the presence of defective wheel bearings before the wheel bearings undergo failure. In addition, it would be desirable if a device could be provided which detects the presence of defective universal joints before the universal joints undergo failure.

Among the motor vehicles on the road, trucks haul large quantities of goods from place to place. The trucking industry loses large amounts of money and time because of breakdowns due to unexpected failures of recapped fires, wheel beatings, and universal joints. Loses of time an money can be related to time and costs of towing, time and costs of repairs at locations away from a home base, and spoilage of perishable products. Loses of time and money could be significantly reduced if defective conditions could be detected before failure results. Also, loses of time and money could be significantly reduced if defective conditions could be repaired at a home base between trips, not in the middle of a trip. In this respect, it would be desirable if a device were provided which detects certain defects in a motor vehicle so that repairs can be made between trips.

A motor vehicle in general, and a truck or tractor trailer in particular, is a very complex piece of machinery that requires a great deal of knowledge and expertise to maintain and repair. Similarly, driving a truck or tractor trailer requires a special combination of knowledge and expertise. As a result, a motor vehicle mechanic is often not a truck driver, and a truck driver is often not a motor vehicle mechanic. This being the case, there are a number of potentially dangerous mechanical conditions that a truck or tractor trailer may have that a truck driver is not aware of. Yet, the truck driver is most at risk if such potentially dangerous conditions develop into actual mechanical failures. In this respect, it would be desirable if a device were provided which enables a truck driver to be aware of potentially dangerous motor vehicle conditions as the truck or tractor trailer is being driven.

In general, trucks or tractor trailers currently in use possess indicator lights or gauges that signal a driver relating to such conditions as oil pressure, engine temperature, engine speed, fuel level, battery power, and brake pressure. However, trucks or tractor trailers currently in use do not possess indicators that signal a driver relating to such conditions as tire recap condition, wheel bearing condition, and universal joint condition. In this respect, it would be desirable if a device were provided that readily retrofits current motor vehicles to monitor and signal a driver with respect to such conditions as tire recap condition, wheel bearing condition, and universal joint condition.

The detection and signalling of diverse potentially hazardous conditions in a moving motor vehicle may require diverse sensing and signalling systems. More specifically, to monitor the three conditions of tire recap condition, wheel bearing condition, and universal joint condition would seem to require three separate monitoring and detection systems. However, to retrofit a currently in use motor vehicle with three separate monitoring and detection systems may be to great a financial and technical burden. In this respect, it would be desirable if a single monitoring and signalling device were provided which simultaneously monitors the three conditions of tire recap condition, wheel bearing condition, and universal joint condition.

A tractor trailer that is commonly referred to as an 18 wheeler literally has 18 wheels. Eight wheels are on the trailer; and ten wheels are on the tractor with two wheels at the front of the tractor and eight wheels at the rear of the tractor. It would be unacceptably burdensome for eighteen separate monitors to be provided for monitoring the condition of recapped tires. Instead, it would be practical for a designated monitor to simultaneously monitor a plurality of wheels. For example, it would be desirable for one monitor assembly to monitor the four left wheels on the trailer. A second monitor assembly could monitor the four right wheels on the trailer. A third monitor assembly could monitor the four rear right wheels of the tractor; and a fourth monitor assembly could monitor the four rear left wheels of the tractor. It would be desirable for a second monitor to monitor the eight rear wheels of the tractor.

Throughout the years, a number of innovations have been developed relating to monitoring certain motor vehicle conditions, and the following U.S. patents are representative of some of those innovations: U.S. Pat. Nos. 4,087,783; and 4,574,490. Neither of these patents permit a driver to monitor the motor vehicle conditions of tire recap condition, wheel bearing condition, and universal joint condition.

In retrofitting current trucks and tractor trailers with monitoring assemblies that can monitor the conditions of tire recap condition, wheel bearing condition, and universal joint condition, it would be desirable to avoid running wires from the monitored sites to the tractor cab in which the driver sits. In this respect, it would be deskable if a monitoring device were provided for monitoring tire recap condition, wheel bearing condition, and universal joint condition that does not require wires running from monitoring assemblies to the driver of the motor vehicle.

Generally speaking, the use of radio waves and other waves for wireless communication from a transmitter to a receiver is well known in the art. The following U.S.

patents, incorporated herein by reference, disclose exemplary wireless communication systems: U.S. Pat. Nos. 3,939,418; 4,876,710; and 5,008,647. None of these patents disclose the use of wireless communication for communicating potentially hazardous conditions of a moving motor vehicle to the driver of the motor vehicle. As a matter of interest, U.S. Pat. No. 5,008,647 discloses a wireless speedometer or odometer for a bicycle that monitors wheel rotations per se. The wheel rotation causes signals to be sent per each rotation. The rotation signals are processed by a computer to indicate time and distance information. No safety information is either monitored or signalled.

Since a plurality of monitoring and signaling assemblies may be located on a single tractor trailer, it would be desirable for a driver to be able to easily select which particular monitoring and signaling assembly the driver wishes to pay particular attention to. In this respect, it would be desirable if a device were provided in the cab of a motor vehicle that readily enables a driver to select a specific monitoring and signaling assembly to pay particular attention to.

Many signaling systems in a motor vehicle require a driver to take one's eyes off the road in order to detect the signal. For example, the driver must look at the temperature gauge, the speedometer, the oil pressure gauge, the battery gauge, and so forth. To avoid creating more situations in which the driver must take one's eyes off the road in order to monitor motor vehicle conditions, it would be desirable if the signal provided to the driver were an audible signal.

Thus, while the foregoing body of prior art indicates it to be well known to use visual signals for monitored motor vehicle conditions, the prior art described above does not teach or suggest a vehicle monitoring apparatus which has the following combination of desirable features: (1) can detect looseness of recapping material on a recapped tire before the recapping material flies off of the tire; (2) can detect the presence of defective wheel bearings before the wheel bearings undergo failure; (3) can detect the presence of defective universal joints before the universal joints undergo failure; (4) can detect certain defects in a motor vehicle so that repairs can be made between scheduled trips as opposed to during a scheduled trip; (5) enables a truck driver to be aware of potentially dangerous motor vehicle conditions as the truck or tractor trailer is being driven; (6) possesses indicators that signal a driver relating to such conditions as tire recap condition, wheel beating condition, and universal joint condition; (7) readily retrofits current motor vehicles to monitor and signal a driver with respect to such conditions as tire recap condition, wheel bearing condition, and universal joint condition; (8) provides a single monitoring and signalling device which simultaneously monitors the three conditions of tire recap condition, wheel bearing condition, and universal joint condition; (9) employs a single monitoring assembly to simultaneously monitor a plurality of wheels; (10) does not require wires running from monitoring assemblies to the driver of the motor vehicle; (11) readily enables a driver to select a specific monitoring and signaling assembly to which particular attention can be paid; and (12) provides a driver of a motor vehicle with an audible signal for potentially hazardous conditions. The foregoing desired characteristics are provided by the unique audible vehicle monitoring apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved audible vehicle monitoring apparatus which includes a sound monitoring assembly adapted for connecting to an undercarriage portion of a wheeled vehicle. The sound monitoring assembly includes a monitoring housing assembly adapted for connecting to the undercarriage portion of the wheeled vehicle. A microphone assembly is retained by the monitor housing assembly. A first power source is housed within the monitor housing assembly. A wave transmitter assembly is powered by the first power source and is retained by the monitor housing assembly. The wave transmitter assembly is connected to the microphone assembly and transmits waves representing sounds picked up by the microphone assembly. The wave transmitter assembly includes a transmitter antenna for transmitting the waves representing sounds picked up by the microphone assembly.

An audible signalling assembly is retained in a cab portion of a motor vehicle in proximity of a driver. The audible signalling assembly includes a signaling housing assembly. A second power source is housed within the signaling housing assembly. A wave receiver assembly is retained by the signaling housing assembly and is powered by the second power source. The wave receiver assembly includes a wave receiving antenna adapted for receiving the transmitted waves from the transmitter antenna of the sound monitoring assembly. The audible signalling assembly includes a speaker assembly which housed within the signaling housing assembly and which is powered by the second power source. The speaker assembly receives audio signals from the wave receiver assembly and provides audible signals to the driver of the motor vehicle.

The audible signalling assembly includes a volume control assembly for adjusting a level of audible signals heard by a driver of the motor vehicle. A plurality of sound monitoring assemblies can be connected to selected locations of the undercarriage portion of the wheeled vehicle, and the audible signalling assembly includes a selector switch assembly for selecting which respective sound monitoring assembly is to be listened to by a motor vehicle driver.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved audible vehicle monitoring apparatus which has all of the advantages of the prior art and none of the disadvantages.

It is another object of the present invention to provide a new and improved audible vehicle monitoring apparatus which may be easily and efficiently manufactured and marketed.

It is a further object of the present invention to provide a new and improved audible vehicle monitoring apparatus which is of durable and reliable construction.

An even further object of the present invention is to provide a new and improved audible vehicle monitoring apparatus which is susceptible of a low cost of manufacture with regard to both materials and labor, and which accordingly is then susceptible of low prices of sale to the consuming public, thereby making such audible vehicle monitoring apparatus available to the buying public.

Still yet a further object of the present invention is to provide a new and improved audible vehicle monitoring apparatus which can detect looseness of recapping material on a recapped tire before the recapping material flies off of the tire.

Still another object of the present invention is to provide a new and improved audible vehicle monitoring apparatus that can detect the presence of defective wheel bearings before the wheel bearings undergo failure.

Yet another object of the present invention is to provide a new and improved audible vehicle monitoring apparatus which can detect the presence of defective universal joints before the universal joints undergo failure.

Even another object of the present invention is to provide a new and improved audible vehicle monitoring apparatus that can detect certain defects in a motor vehicle so that repairs can be made between scheduled trips as opposed to during a scheduled trip.

Still a further object of the present invention is to provide a new and improved audible vehicle monitoring apparatus which enables a truck driver to be aware of potentially dangerous motor vehicle conditions as the truck or tractor trailer is being driven.

Yet another object of the present invention is to provide a new and improved audible vehicle monitoring apparatus that possesses indicators that signal a driver relating to such conditions as tire recap condition, wheel bearing condition, and universal joint condition.

Still another object of the present invention is to provide a new and improved audible vehicle monitoring apparatus which readily retrofits current motor vehicles to monitor and signal a driver with respect to such conditions as tire recap condition, wheel bearing condition, and universal joint condition.

Yet another object of the present invention is to provide a new and improved auricle vehicle monitoring apparatus that provides a single monitoring and signalling device which simultaneously monitors the three conditions of tire recap condition, wheel bearing condition, and universal joint condition.

Still a further object of the present invention is to provide a new and improved audible vehicle monitoring apparatus that employs a single monitoring assembly to simultaneously monitor a plurality of wheels.

Yet another object of the present invention is to provide a new and improved audible vehicle monitoring apparatus which does not require wires running from monitoring assemblies to the driver of the motor vehicle.

Still a further object of the present invention is to provide a new and improved audible vehicle monitoring apparatus that readily enables a driver to select a specific monitoring and signaling assembly to which particular attention can be paid.

Yet another object of the present invention is to provide a new and improved audible vehicle monitoring apparatus which provides a driver of a motor vehicle with an audible signal for potentially hazardous conditions.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a front view showing a preferred embodiment of a receiver module of the audible vehicle monitoring apparatus of the invention.

FIG. 2 is a perspective view of a plurality of transmitter modules of the audible vehicle monitoring apparatus of the invention installed on a tractor and trailer.

DESCRIPTION OF THE PREFERRED EMBODIMENT

Figure 3:
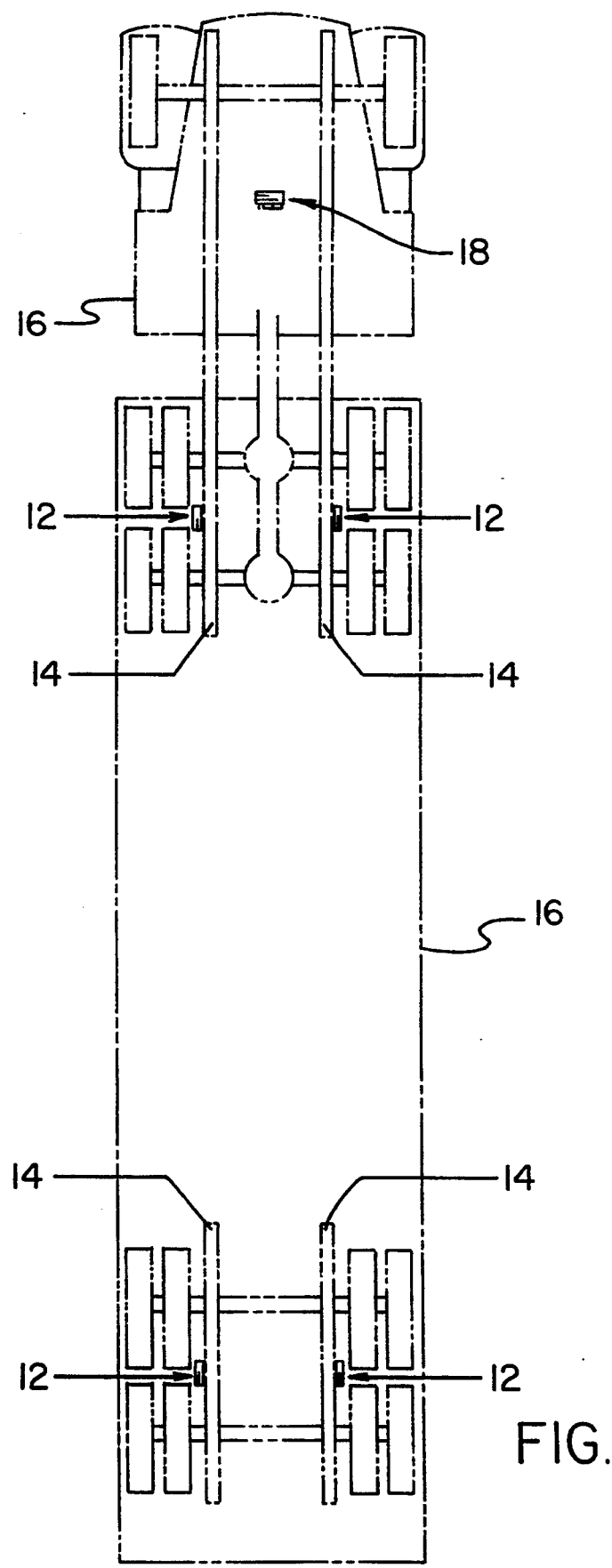
FIG. 3 is a bottom view of the tractor and trailer shown in FIG. 2 showing a plurality of transmitter modules of the invention installed on the tractor and trailer.
Figure 4:
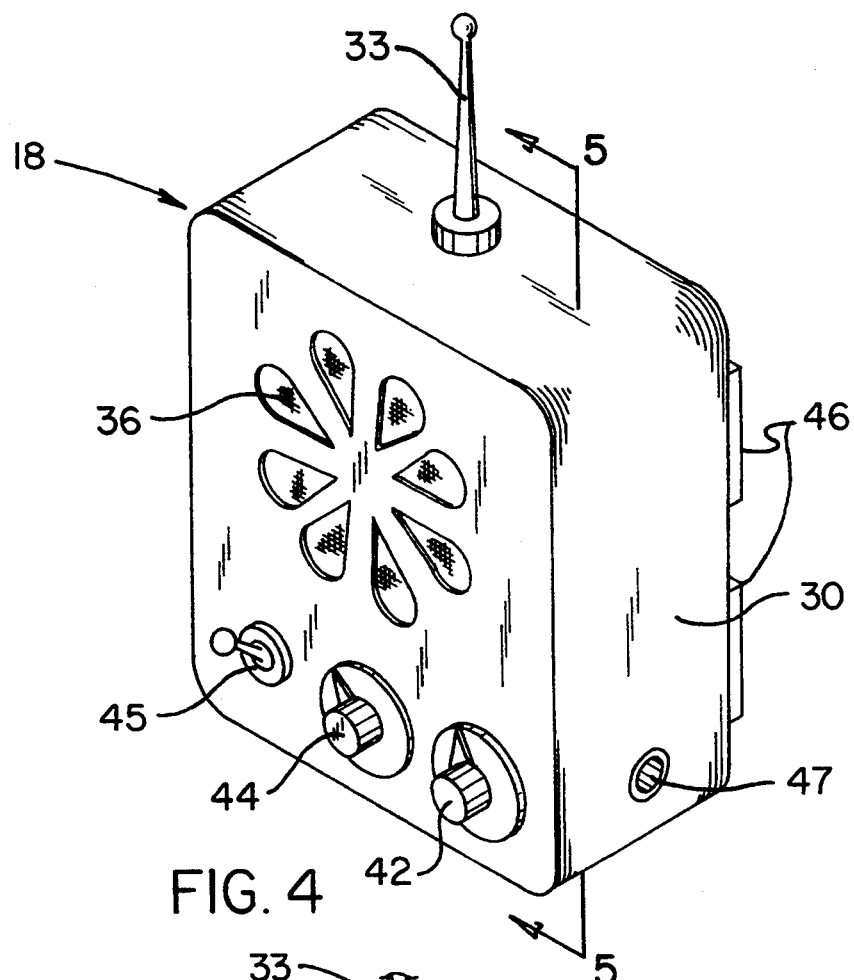
FIG. 4 is a perspective view of the receiver module of the audible vehicle monitoring apparatus of the invention shown in FIG. 1.

With reference to the drawings, a new and improved audible vehicle monitoring apparatus embodying the principles and concepts of the present invention will be described.

Turning to FIGS. 1-7, there is shown an exemplary embodiment of the audible vehicle monitoring apparatus of the invention which includes a sound monitoring assembly 12 adapted for connecting to an undercarriage portion 14 of a wheeled vehicle 16. As shown in detail in FIGS. 6 and 7, the sound monitoring assembly 12 includes a monitoring housing assembly 22 adapted for connecting to the undercarriage portion 14 of the wheeled vehicle 16. A microphone assembly 24 is retained by the monitor housing assembly 22. A first power source 26 is housed within the monitor housing assembly 22. A wave transmitter assembly 28 is powered by the first power source 26 and is retained by the monitor housing assembly 22. The wave transmitter assembly 28 is connected to the microphone assembly 24 and transmits waves representing sounds picked up by the microphone assembly 24. The wave transmitter assembly 28 includes a transmitter antenna 29 for transmitting the waves representing sounds picked up by the microphone assembly 24.

An audible signalling assembly 18 is retained in a cab portion 20 of a motor vehicle in proximity of a driver. As shown in detail in FIGS. 4 and 5, the audible signalling assembly 18 includes a signaling housing assembly 30. A second power source 34 is housed within the signaling housing assembly 30. A wave receiver assembly 32 is retained by the signaling housing assembly 30 and is powered by the second power source 34. The wave receiver assembly 32 includes a wave receiving antenna 33 adapted for receiving the transmitted waves from the transmitter antenna 29 of the sound monitoring assembly 12. The audible signalling assembly 18 includes a speaker assembly 36 which housed within the signaling housing assembly 30 and which is powered by the second power source 34. The speaker assembly 36 receives audio signals from the wave receiver assembly 32 and provides audible signals to the driver of the motor vehicle.

Figure 6:
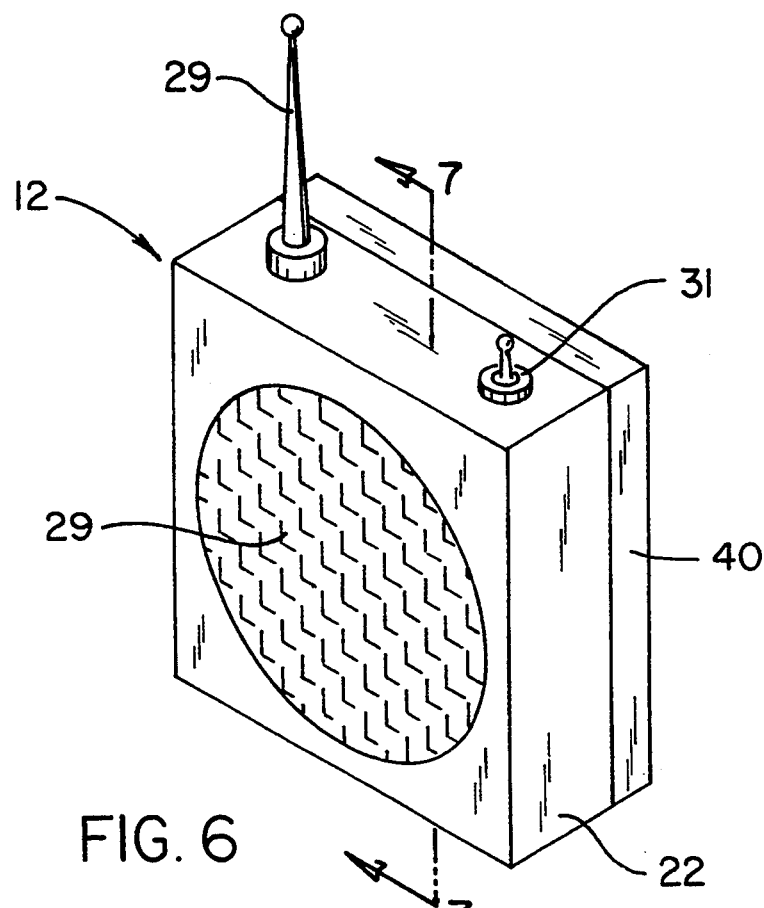
FIG. 6 is an enlarged perspective view of a single transmitter module of the audible vehicle monitoring apparatus of the invention.

As shown in FIG. 6, the microphone assembly 24 includes a microphone module 25 located at a focus of a parabolic mirror 27. The parabolic mirror 27 directs picked up sound waves from a number of directions to the microphone module 25 at the focus of the parabolic mirror 27. A screen 29 is provided to protect the microphone assembly 24. An on/off switch 31 is also provided to turn any respective sound monitoring assembly 12 on or off as desired.

The audible signalling assembly 18 includes a volume control assembly 42 for adjusting a level of audible signals heard by a driver of the motor vehicle. A plurality of sound monitoring assemblies 12 can be connected to selected locations of the undercarriage portion 14 of the wheeled vehicle 16, and the audible signalling assembly 18 includes a selector switch assembly 44 for selecting which respective sound monitoring assembly 12 is to be listened to by a motor vehicle driver. An on/off switch assembly 45 can be provided for the audible signalling assembly 18. Also, a jack 47 is provided for receiving a plug from an auxiliary source of power.

The locations of the undercarriage portions 14 of the wheeled vehicle 16, where sound monitoring assemblies 12 are affixed, are selected in order to provide sound monitoring for a plurality of motor vehicle structures that are connected to the undercarriage portion 14. That is, a particular sound monitoring assembly 12 monitors a plurality of motor vehicle structures. As shown in detail in FIGS. 2 and 3, for example, a first sound monitoring assembly 12 is positioned near the four left rear wheels of a trailer to monitor sounds emanating from all beatings and all tires associated with the four left rear trailer wheels. A second sound monitoring assembly 12 is positioned near the four fight rear wheels of the trailer to monitor sounds emanating from all beatings and all tires associated with the four fight rear trailer wheels.

Similarly, a third sound monitoring assembly 12 is positioned near the four left rear wheels of a tractor to monitor sounds emanating from all bearings and all tires associated with the four left rear tractor wheels. In addition, a fourth sound monitoring assembly 12 is positioned near the four fight rear wheels of a tractor to monitor sounds emanating from all bearing and all tires associated with the four fight rear tractor wheels.

Each of the first, the second, the third, and the fourth sound monitoring assemblies 12 simultaneously monitors the respective wheel bearings and the respective tires of the associated wheels. The driver of the motor vehicle can get used to a background or baseline sound pattern from each respective sound monitoring assembly 12. When the background or baseline sound perceptibly changes, such perceptible changes may reflect the development of unsafe changes in the respective wheel bearings and tires. For example, the wheel bearings may be going bad, and the tire recaps may be loosening from the tire bodies. Such potentially hazardous conditions may be heard by the driver, and corrective actions can be taken before an actual hazard develops.

Still further, a fifth sound monitoring assembly 12 is positioned near the universal joints of the tractor to monitor sounds emanating from the universal joints of the tractor. Still additional sound monitoring assemblies 12 can be used if desired.

Figure 7:
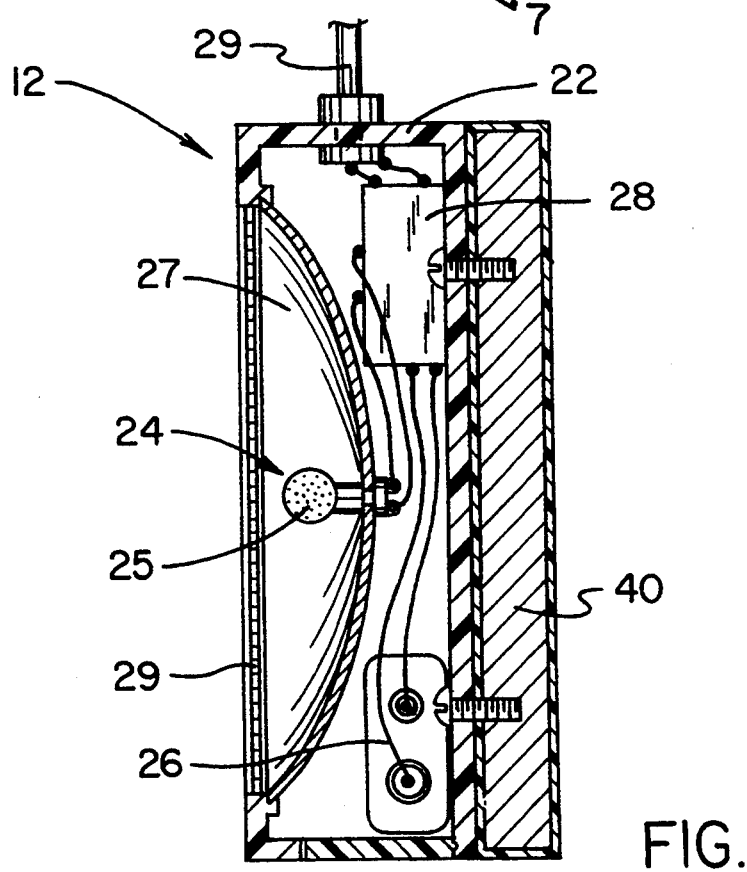
FIG. 7 is an enlarged cross-sectional view of the transmitter module shown in FIG. 6 taken along line 7—7 of FIG. 6.

In order to connect the respective sound monitoring assemblies 12 to the undercarriage portion 14 of the wheeled vehicle 16, any suitable connection devices can be used such as screws, bolts, and clamps. As shown in FIG. 7, a plastic covered permanent magnet assembly 40 can be connected to the monitoring housing assembly 22 and can be used to attach the sound monitoring assembly 12 to a ferrous-metal containing portion of the undercarriage portion 14 of the wheeled vehicle 16.

Figure 5:
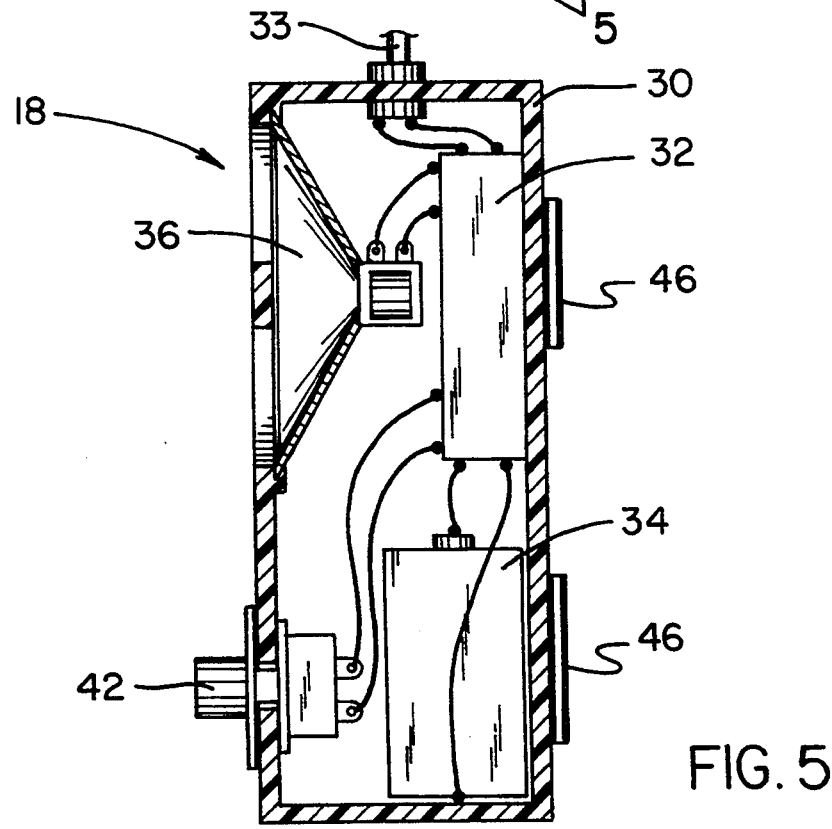
FIG. 5 is an enlarged cross-sectional view of the receiver module shown in FIG. 4 taken along line 5—5 of FIG. 4.

In order to most effectively utilize the audible signalling assembly 18, it may be desirable to fix or attach the audible signalling assembly 18 to a convenient location in the cab portion 20 of the motor vehicle. Such a convenient location would be within easy hearing and within easy reach of the driver. A variety of suitable devices for attaching the audible signalling assembly 18 to a suitable location in the cab portion 20 of the motor vehicle may be employed and include screws, bolts, and adhesives. As shown in FIG. 5, double-sided adhesive tape 46 can be employed on a back side of the signaling housing assembly 30 of the audible signalling assembly 18. The double-sided adhesive tape 46 can be used to affix the audible signalling assembly 18 to a dashboard. The first power source 26 and the second power source 34 can be small batteries such a 9 volt batteries.

The components of the audible vehicle monitoring apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved audible vehicle monitoring apparatus that is low in cost, relatively simple in design and operation, and which may advantageously be used to detect looseness of recapping material on a recapped tire before the recapping material flies off of the tire. With the invention, an audible vehicle monitoring apparatus is provided which can detect the presence of defective wheel bearings before the wheel beatings undergo failure. With the invention, an audible vehicle monitoring apparatus is provided which can detect the presence of defective universal joints before the universal joints undergo failure. With the invention, an audible vehicle monitoring apparatus is provided which can detect certain defects in a motor vehicle so that repairs can be made between scheduled trips as opposed to during a scheduled trip. With the invention, an audible vehicle monitoring apparatus is provided which enables a truck driver to be aware of potentially dangerous motor vehicle conditions as the truck or tractor trailer is being driven. With the invention, an audible vehicle monitoring apparatus is provided which possesses indicators that signal a driver relating to such conditions as tire recap condition, wheel bearing condition, and universal joint condition.

With the invention, an audible vehicle monitoring apparatus is provided which readily retrofits current motor vehicles to monitor and signal a driver with respect to such conditions as tire recap condition, wheel bearing condition, and universal joint condition. With the invention, an audible vehicle monitoring apparatus is provided which provides a single monitoring and signalling device which simultaneously monitors the three conditions of tire recap condition, wheel bearing condition, and universal joint condition. With the invention, an audible vehicle monitoring apparatus is provided which employs a single monitoring assembly to simultaneously monitor a plurality of wheels. With the invention, an audible vehicle monitoring apparatus is provided which does not require wires running from monitoring assemblies to the driver of the motor vehicle. With the invention, an audible vehicle monitoring apparatus is provided which readily enables a driver to select a specific monitoring and signaling assembly to which particular attention can be paid. With the invention, an audible vehicle monitoring apparatus is provided which provides a driver of a motor vehicle with an audible signal for potentially hazardous conditions.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

I claim:

1. A new and improved audible vehicle monitoring apparatus, comprising:

a plurality of sound monitoring assemblies adapted for connecting to selected undercarriage portions of a wheeled vehicle, each sound monitoring assembly including a monitor housing assembly adapted for connecting to a respective selected undercarriage portion, a respective microphone assembly retained by each of said monitor housing assemblies, a first power source housed within each respective monitor housing assembly, a wave transmitter assembly powered by each respective first power source and retained by each respective monitor housing assembly, each respective wave transmitter assembly connected to a respective microphone assembly and adapted for transmitting waves representing sounds picked up by said respective microphone assembly, wherein each wave transmitter assembly includes a transmitter antenna for transmitting said waves representing sounds picked up by each respective microphone assembly, and an audible signalling assembly adapted to be retained in a cab portion of a motor vehicle in proximity of a driver, said audible signalling assembly including a signaling housing assembly, a second power source housed within said signaling housing assembly, a wave receiver assembly retained by said signaling housing assembly and powered by said second power source wherein said wave receiver assembly includes a wave receiving antenna adapted for receiving said transmitted waves from each of said respective wave transmitter assemblies of said sound monitoring assemblies, said audible signalling assembly including a speaker assembly housed within said signalling housing assembly and powered by said second power source wherein said speaker assembly receives audio signals from said wave receiver assembly and provides audible signals to the driver of the motor vehicle, wherein said audible signalling assembly includes a volume control assembly for adjusting a level of audible signals heard by the driver of the motor vehicle, and a selector switch assembly, housed in said signaling housing assembly, for selecting which respective sound monitoring assembly is to be listened to by the motor vehicle driver.

* * * * *